Nov. 6, 1962

E. A. QUADE ETAL 3,063,041

HIGH SPEED REACTION DRUM

Filed Aug. 19, 1958

INVENTORS.
WILLIAM E. STEELE
EDWARD A. QUADE
BY John B. Aponsler
AGENT

United States Patent Office 3,063,041

Patented Nov. 6, 1962

3,063,041

HIGH SPEED REACTION DRUM

Edward A. Quade, San Jose, and William E. Steele, Irvington, Calif., assignors to International Business Machines Corporation, New York, N.Y., a corporation of New York Filed Aug. 19, 1958, Ser. No. 755,905
2 Claims. (Cl. 340—174.1)

The present invention relates to an air driven drum utilized as a magnetic data storage device and more particularly to such a drum wherein its peripheral bearing support, its end thrust bearings, and its driving energy are all provided by a single stream of injected gas, such as air.

Generally, in electronic calculating and other machines it is common practice to employ a rotary member, such as a disc or drum, coated with a layer of magnetic material and to mount one or more transducer heads closely adjacent the magnetic surface of such rotary member so that upon rotation of the latter each transducer head follows a given path around it. The transducer heads are energized at selected times to impress magnetic data bits at predetermined points along the magnetic paths which they traverse during rotation of the storage drum, and to detect such bits after they have been so impressed. In order to produce a high bit density on the recording surface, it is desirable that the recording surface rotate at as high a speed as possible and that the transducer head be positioned as close as possible to the recording surface. The attainment of these objectives is complicated in conventional recording devices by the limitations imposed by the mechanical bearings used. That is, even with high precision mechanical bearings and with precision machining of the rotary member and its housing, the required runout tolerance is still great enough to prevent the desired closeness of spacing of the transducer head from the rotary member.

To eliminate the limitations imposed by mechanical bearings, there is disclosed in copending applications, Serial Nos. 706,006, now Patent No. 3,029,416; 706,007; and 737,582, assigned to the same assignee as the present application, a magnetic data storage device in which both the bearing support for the rotary member and the energy for rotating the recording member are provided by a stream of injected gas.

Briefly stated, according to the present invention a cylindrical drum is mounted for rotation within the bore of a housing and is provided with a plurality of grooves or open slots cut into each of its end surfaces. These grooves are connected to a source of pressurized gas so as to discharge a stream of such gas into the bore of the housing from within the drum, i.e., so as to reactively drive the drum, as distinguished from driving the drum by impeller action. In addition, these grooves supply air thrust bearings at each end surface of the drum and also provide a gas film around the periphery of the drum to axially center the drum precisely within its bore.

While the invention herein will be described as operating on air, it is to be understood that other gases or fluids can be substituted without departing from the invention.

Therefore, it is an object of this invention to provide an improved air driven magnetic drum.

It is another object of this invention to provide an air reaction driven drum wherein a plurality of grooves or slots cut in each end surface of the drum supply the threefold function of absorbing thrust at each end of the drum, reaction driving of the drum, and axially supporting the drum precisely in the center of its bore.

Other objects of the invention will be pointed out in the following description and claims and illustrated in the accompanying drawings which disclose, by way of example, the principle of the invention and the best mode which has been contemplated of applying that principle.

Figure 2:
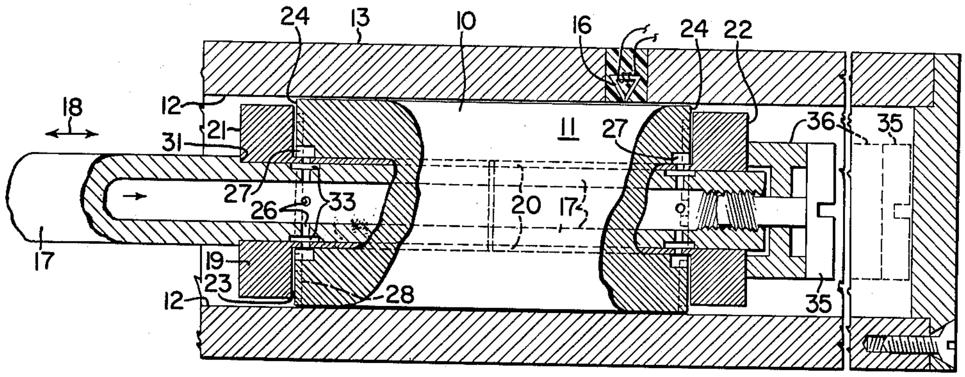
FIG. 2 is an elevation view of the drum within its housing.
Figures 1, 4:
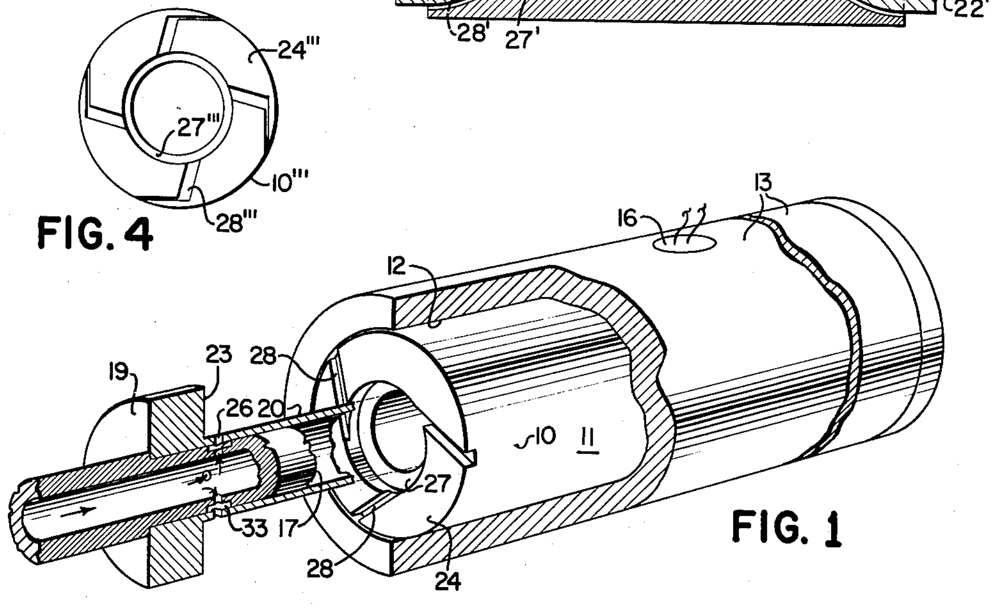
FIG. 1 is a perspective view of the drum best showing the arrangement of the grooves of the invention.

Referring to the drawings, and particularly to FIGS. 1 and 2, there is provided a drum 10 of generally cylindrical shape, provided on the periphery thereof with a coating 11 of a suitable magnetic material, such as the iron oxide coating material commonly used for such purposes. As is well known, such coating may be applied in any suitable manner, such as by spraying, brushing, rolling, plating or otherwise. Drum 10 is journaled within a bore 12 formed in a housing 13. Housing 13 may be of any suitable material such as metal or plastic and must be of sufficient strength and rigidity to maintain its shape and resist centrifugal expansion of the drum 10 during rotation of the drum. Sufficient clearance exists between the outer peripheral surface of drum 10 and the inner wall of housing 13 to permit drum 10 to rotate freely within bore 12 while still permitting the magnetic surface of drum 10 to be disposed closely adjacent a transducer head 16 which is arranged in housing 13 in a position to magnetically cooperate with drum 10 for recording and reproducing data. The end of transducer 16 is machined exactly flush with the inner surface of housing 13 so that clearances as small as 50 micro inches are provided between the surface of drum 10 and housing 13 and transducer 16.

Only one transducer 16 is shown since it is envisioned that drum 10 is to be positionable lengthwise within bore 12 in a manner similar to that disclosed in the aforementioned copending application Serial No. 737,582. However, it will be readily apparent that a plurality of transducers could be closely spaced apart lengthwise or helically of drum 10 for coaction therewith in a conventional manner.

A hollow positioning shaft 17, longitudinally displaceable as indicated by arrow 18, extends axially through the interior of drum 10. A pair of end cap members 21 and 22 fit over shaft 17 and each is provided with a flat flange portion 19 having a smooth and flat inner surface 23 substantially parallel to and facing the end surfaces 24 of drum 10 and a sleeve portion 20 which extends inside drum 10 over shaft 17. Sleeves 20 are provided with holes 26 located slightly inwardly of the inner surface 23 of flange portions 19. Holes 26 communicate with an annular recess 27 or manifold hollowed out of each end of drum 10.

Each end of drum 10 is also provided with a number of grooves 28 cut therein along a chord of the circle defined by a plane intersecting the axis of drum 10 normal thereto. Chordal grooves 28 terminate on the outer periphery of drum 10 at an angle to a plane drawn thereat tangent to drum 10, while at their inner extremities, grooves 28 lead into recess 27.

The diameter of shaft 17 is slightly reduced to form a seat 31 against which end cap member 21 rests. The hollow interior of shaft 17 is open to recess 27 by the provision of a number of holes 32 located in shaft 17 and a circumferential cut 33 around the outside of shaft 17. Cut 33 is located adjacent holes 26 in sleeves 20 and recess 27. Thus, an air path is defined at each end of drum 10 from the hollow interior of shaft 17 through holes 32 therein, cut 33, holes 26 in sleeve 20, manifold recess 27, grooves 28 and thence into bore 12.

End cap 22 is held in position relative to shaft 17 by a screw 35 which engages a tapped opening in the end of shaft 17. A spacer 36 is preferably provided between screw 35 and end cap 22 to prevent screw 35 from closing openings 26 in the end of shaft 17. A slight clearance is maintained between end caps 21 and 22 and the ends of drum 10 so that drum 10 is free to rotate within bore 12 and between end caps 21 and 22.

In operation air is injected by suitable means such as a pump (not shown) into the interior of shaft 17 and exhausted therefrom via the paths defined above, including grooves 28. The air escaping from grooves 28 reactively drives drum 10 and, since grooves 28 openly communicate with the interstice between the inner surface 23 of each flange portion 19 and each end surface 24 of drum 10, grooves 28 provide a thrust bearing film of air therebetween as well. Further, the air exhausting into bore 12 via grooves 28 supplies air to provide a film between the periphery of drum 10 and the inner wall of housing 13 to centrally support drum 10 axially within bore 12. Thus, grooves 28 perform a unique threefold function, i.e., (1) that of a thrust bearing, (2) a reaction drive and (3) an axial support for drum 10.

Figure 3:
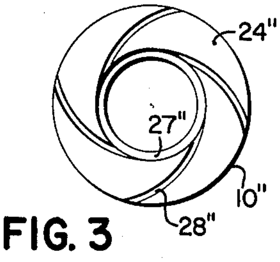
FIGS. 3 and 4 show alternative groove arrangements for providing the above threefold function.
Figure 5:
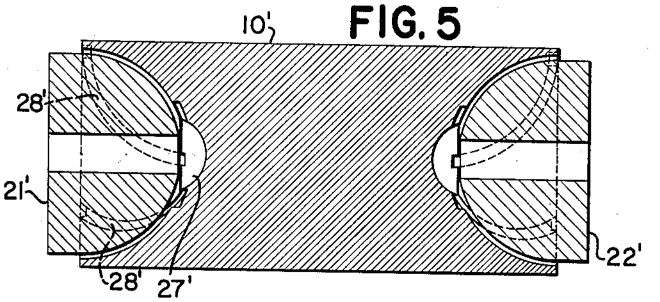
FIG. 5 shows an alternative embodiment of the invention wherein the end surface of the drum is rounded and concentric with the end cap member.

Although grooves 28 have been described as "chordal" it will be at once apparent from the drawings that they do not constitute true chords since each intersects the cylindrical periphery of drum 10 only once, whereas a true chord would intersect a circle in two places. Therefore, the adjective "chordal" is used herein with this modification in mind. Further, grooves 28 could be formed as in FIGS. 3 and 4 without departing from the invention herein in that they would still perform the threefold function above. From a manufacturing viewpoint, however, the embodiment shown in FIG. 1 is preferred since the ends of drum 10 need only be milled off square with the axis of drum 10 and then a number of simple cuts may be made therein to provide the chordal grooves 28 shown. Finally, although end surfaces 24 are flat and parallel to the inner surfaces 23 of the flange portions 19, it is not beyond the scope of this invention to employ end cap members with a rounded inner surface substantially concentric with a rounded end on drum 10, as shown in FIG. 5. In the sense that concentric surfaces never meet, they may be referred to as "parallel." Therefore, the term "parallel" as used herein shall be deemed to include such concentric surfaces.

While there have been shown and described and pointed out the fundamental novel features of the invention as applied to the preferred embodiment, it will be understood that various omissions and substitutions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic data storage device including a housing having a cylindrical bore therein, a cylindrical drum provided with a smooth surface at each end thereof, said drum being free to rotate within said bore, an end member adjacent each of said end surfaces of said drum, each of said end members having a smooth bearing surface positioned substantially parallel to and closely spaced from an associated one of said end surfaces of said drum, a plurality of grooves formed in each of said end surfaces of said drum, and means for passing a gas first through said grooves to reactively rotate said drum and then into said bore to support said drum on a film of said gas between the periphery of said drum and said bore while supplying a gas film between said substantially parallel surfaces to absorb thrust therebetween.

2. In a magnetic data storage device having a housing with a cylindrical bore therein and a cylindrical drum mounted for rotation within said bore, a combination driving, supporting and thrust bearing means comprising a smooth, flat end surface at each end of said drum, an end member adjacent each of said end surfaces, each of said end members having a smooth flat bearing surface positioned substantially parallel to and closely spaced from an associated one of said end surfaces, an air receiving chamber disposed interiorly of each end of said drum, a plurality of chordal grooves interposed between said bore and said chambers and formed in each of said end surfaces of said drum, and means for passing a single stream of air under pressure into said chambers and thence through said grooves to reactively rotate said drum and then into said bore to support said drum on a film of air between the periphery of said drum and said bore while supplying an air film between said substantially parallel surfaces to absorb thrust therebetween.

References Cited in the file of this patent

UNITED STATES PATENTS

| | | |
|---|---|---|
| 2,671,700 | Seyffert | Mar. 9, 1954 |
| 2,729,106 | Mathiesen | Jan. 3, 1956 |
| 2,787,750 | Jones | Apr. 2, 1957 |
| 2,854,298 | Baumeister | Sept. 30, 1958 |
| 2,883,475 | Ridler et al. | Apr. 21, 1959 |
| 2,915,358 | Richards | Dec. 1, 1959 |
| 2,929,671 | Taylor | Mar. 22, 1960 |